US012184998B2

United States Patent
Wu

(10) Patent No.: US 12,184,998 B2
(45) Date of Patent: Dec. 31, 2024

(54) GLOBAL SHUTTER SENSOR WITH PARASITIC LIGHT SENSITIVITY COMPENSATION

(71) Applicant: PIXART IMAGING INC., Hsin-Chu County (TW)

(72) Inventor: Chih-Huan Wu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 211 days.

(21) Appl. No.: 18/076,392

(22) Filed: Dec. 7, 2022

(65) Prior Publication Data

US 2024/0196109 A1 Jun. 13, 2024

(51) Int. Cl.
*H04N 5/335* (2011.01)
*H04N 23/73* (2023.01)
*H04N 25/51* (2023.01)
*H04N 25/532* (2023.01)

(52) U.S. Cl.
CPC ........... *H04N 25/532* (2023.01); *H04N 23/73* (2023.01); *H04N 25/51* (2023.01)

(58) Field of Classification Search
CPC ............................ H04N 25/51; H04N 25/532
See application file for complete search history.

(56) References Cited

U.S. PATENT DOCUMENTS 10,057,516 B2 * 8/2018 Yeh ........................ H04N 23/73
11,290,671 B2 3/2022 Liu et al.

* cited by examiner

*Primary Examiner* — Gary C Vieaux
(74) *Attorney, Agent, or Firm* — HAUPTMAN HAM, LLP

(57) ABSTRACT

There is provided a global shutter sensor including a pixel array and a processor. The pixel array acquires first pixel data corresponding to a first exposure period and second pixel data corresponding to a second exposure period of different pixel regions using time division or spatial division, wherein the first exposure period is shorter than the second exposure period. The processor calculates a difference between (the second exposure period/the first exposure period)×the first pixel data and the second pixel data to obtain parasitic light sensitivity of the different pixel regions, and determines gains and/or exposure periods corresponding to the different pixel regions to compensate the parasitic light sensitivity.

20 Claims, 7 Drawing Sheets

B1 — row with B G B G B G B G / G R G R G R G R

B2 — row with B G B G B G B G / G R G R G R G R

GLOBAL SHUTTER SENSOR WITH PARASITIC LIGHT SENSITIVITY COMPENSATION

BACKGROUND

1. Field of the Disclosure

This disclosure generally relates to a global shutter sensor and, more particularly, to a global shutter sensor that uses different gains and/or exposure periods corresponding to different pixel regions or different frames to compensate brightness nonuniformity caused by parasitic light sensitivity.

2. Description of the Related Art

The complementary metal-oxide-semiconductor (CMOS) sensor has a wide range of applications. Corresponding to different applications, the CMOS sensor can be operated in a rolling shutter mode or a global shutter mode.

For example. FIG. 1 is an operational schematic diagram of a conventional CMOS sensor. The CMOS sensor includes multiple pixel rows (e.g., shown as row1 to rowN). The pixel row1 to the pixel rowN are exposed simultaneously, and charges induced during the exposure are transferred to be stored at the floating diffusion. Next, a readout circuit reads the charges at the floating diffusion sequentially from the pixel row1 to the pixel rowN.

However, one drawback to store the charges at the floating diffusion is that the floating diffusion is light sensitive. The signal stored at the floating diffusion can be influenced by light collected within the storage time (referred to parasitic light sensitivity). As shown in FIG. 1, charges in pixel rows closer to the pixel rowN are stored for a longer time (shown by length) than in pixel rows closer to the pixel row1 to cause a gradient in the image, i.e., last rows of the image are brighter than previous rows of the image.

Accordingly, the present disclosure provides a global shutter sensor that calculates parasitic light sensitivity using a time-based method or a spatial-based method to accordingly determine gains and/or exposure periods corresponding to different pixel regions.

SUMMARY

The present disclosure provides a global shutter sensor that calculates parasitic light sensitivity using pixel data acquired by the same pixel using different exposure periods, and determines gains and/or exposure periods of different pixel regions according to ratios of the parasitic light sensitivity between the different pixel regions.

The present disclosure further provides a global shutter sensor that calculates parasitic light sensitivity using pixel data acquired by different pixels using different exposure periods, and determines gains and/or exposure periods of different pixel regions according to ratios of the parasitic light sensitivity between the different pixel regions.

The present disclosure provides a global shutter sensor including a pixel array and a processor. The pixel array has a first pixel region and a second pixel region. The pixel array acquires a first image frame and a second image frame respectively using a first exposure period and a second exposure period, which is longer than the first exposure period. The processor receives first pixel data corresponding to the first exposure period and second pixel data corresponding to the second exposure period outputted by the first pixel region, calculates a first compensation value of the first pixel region based on the first pixel data and the second pixel data, receives third pixel data corresponding to the first exposure period and fourth pixel data corresponding to the second exposure period outputted by the second pixel region, calculates a second compensation value of the second pixel region based on the third pixel data and the fourth pixel data, and adjusts exposure periods or gains of the first pixel region and the second pixel region based on the first compensation value and the second compensation value.

The present disclosure further provides a global shutter sensor including a pixel array and a processor. The pixel array acquires first pixel data and second pixel data respectively using a first exposure period and a second exposure period, which is different from the first exposure period. The processor receives the first pixel data and the second pixel data, calculates a compensation value of the pixel array based on the first pixel data and the second pixel data, and adjusts exposure periods or gains of the pixel array based on compensation values of different pixel regions.

The present disclosure further provides a global shutter sensor including a pixel array and a processor. The pixel array acquires a first image frame and a second image frame respectively using a first exposure period and a second exposure period. The processor determines the first exposure period and the second exposure period according to auto-exposure, identifies a motion according to the first image frame and the second image frame upon the first exposure period being identical to the second exposure period, and calculates parasitic light sensitivity based on the first image frame and the second image frame upon the first exposure period being different from the second exposure period and adjusts exposure periods or gains of the pixel array based on parasitic light sensitivity of different pixel regions.

BRIEF DESCRIPTION OF THE DRAWINGS

Other objects, advantages, and novel features of the present disclosure will become more apparent from the following detailed description when taken in conjunction with the accompanying drawings.

FIGS. 5A-5C are schematic diagrams of arranging different exposed pixels in a color pixel array with a Bayer pattern of a global shutter sensor according to some embodiments of the present disclosure.

DETAILED DESCRIPTION OF THE EMBODIMENT

It should be noted that, wherever possible, the same reference numbers will be used throughout the drawings to refer to the same or like parts.

One objective of the present disclosure is to provide a global shutter sensor that can compensate parasitic light sensitivity (PLS) to cause an image to have a better uniformity. The present disclosure uses a time-based method to calculate the parasitic light sensitivity corresponding to the same or different pixel regions, or uses a spatial-based method to calculate the parasitic light sensitivity corresponding to different pixel regions, and to determine gains and/or exposure periods according to ratios of parasitic light sensitivity between the different pixel regions to compensate the PLS, or according to an average or a weighting summation of parasitic light sensitivity of the different pixel regions.

Figure 1:
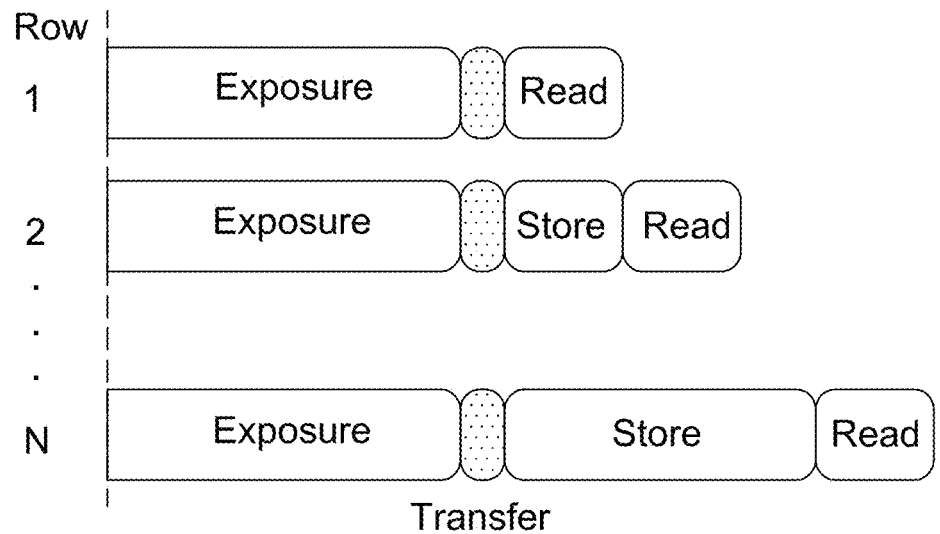
FIG. 1 is an operational schematic diagram of a conventional global shutter sensor.
Figure 2:
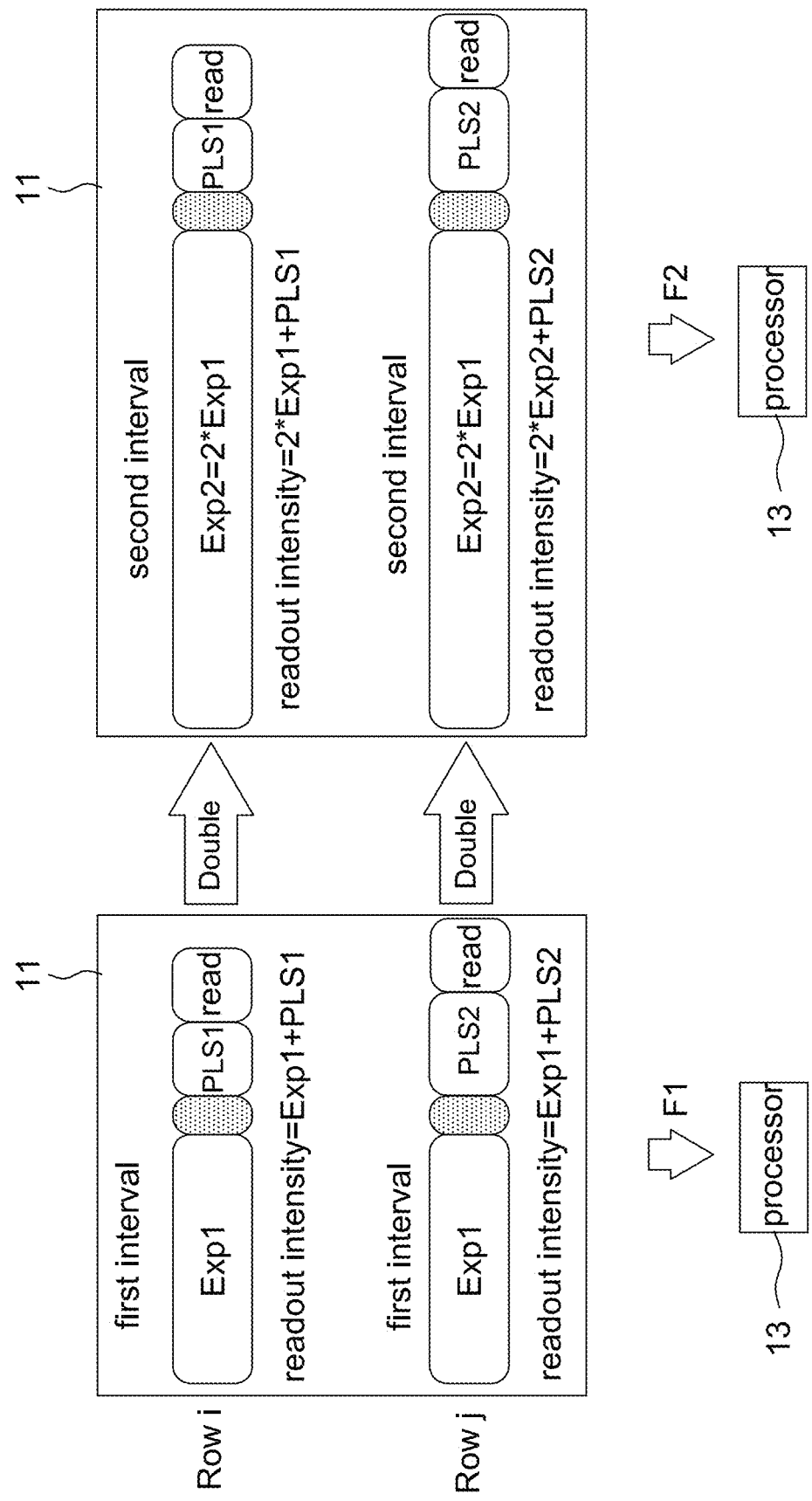
FIG. 2 is a schematic diagram of obtaining the parasitic light sensitivity using a time division by a global shutter sensor according to one embodiment of the present disclosure.

Please refer to FIG. 2, it a schematic diagram of obtaining the parasitic light sensitivity using a time-based method (e.g., shown as a first interval and a second interval) by a global shutter sensor according to one embodiment of the present disclosure. The global shutter sensor is, for example, a CMOS image sensor which includes a pixel array 11 and a processor 13. The pixel array 11 includes multiple pixel rows (e.g., only two rows i and j being shown). The processor 13 is, for example, a digital signal processor (DSP), an application specific integrated circuit (ASIC), a field programmable gate array (FPGA) or a micro controller unit (MCU). The processor 13 is used to process pixel data outputted by the pixel array 11, e.g., shown as image frames F1 and F2. Said processing includes calculating a motion, calculating parasitic light sensitivity and compensating brightness using gains and/or exposure periods.

In the present disclosure, the processor 13 obtains parasitic light sensitivity by receiving pixel data (or called intensity) acquired by two different exposure periods (e.g., shown as Exp1 and Exp2) and by calculating a difference of time-normalized pixel data. For example, FIG. 2 shows that a first intensity value (Exp1+PLS1) is obtained by exposing a pixel row i by an exposure period Exp1 and a storage interval (e.g., parasitic light sensitivity shown by PLS1); and a second intensity value (2Exp1+PLS1) is obtained by exposing the pixel row i by two times of the exposure period Exp1 and the storage interval, which is not increased and thus the parasitic light sensitivity is still PLS1. Therefore, subtracting the two times of the first intensity value (shown as readout intensity) by the second intensity value (shown as readout intensity), the parasitic light sensitivity PLS1 corresponding to the pixel row i is obtained, wherein the pixel row i may indicate one or multiple pixel rows.

In the present disclosure, as long as the parasitic light sensitivity corresponding to each pixel is obtained, corresponding gains (including digital gain and analog gain) and/or exposure periods can be adjusted according to ratios between the obtained parasitic light sensitivity, or according to an average or a weighting summation of the obtained parasitic light sensitivity so as to compensate the image nonuniformity caused by different parasitic light sensitivity. The present disclosure can realize the pixel-level adjustment.

Please refer to FIG. 2 again, the pixel array 11 includes a first pixel region (e.g., pixel row i) and a second pixel region (e.g., pixel row j, indicating one or multiple pixel rows). In this aspect, the first pixel region and the second pixel region are different at least one pixel row, but not limited to one pixel row. Preferably, the second pixel region is behind (i.e. j>i) the first pixel region in the pixel array 11.

The pixel array 11 successively acquires a first image frame F1 and a second image frame F2 respectively using a first exposure period Exp1 and a second exposure period Exp2, wherein the first exposure period Exp1 is different from (e.g., shorter than) the second exposure period Exp2. FIG. 2 shows that Exp2=2×Exp1 as an example, but the present disclosure is not limited thereto.

In FIG. 2, the first interval is a frame period for acquiring the first image frame F1, and the second interval is a frame period for acquiring the second image frame F2.

The processor 13 receives first pixel data (e.g., shown as Exp1+PLS1) corresponding to the first exposure period Exp1 and second pixel data (e.g., shown as 2×Exp1+PLS1) corresponding to the second exposure period Exp2 outputted by the first pixel region, and calculates a first compensation value of the first pixel region based on the first pixel data and the second pixel data, e.g., calculating a first difference between the first pixel data×(second exposure period/first exposure period) and the second pixel data, i.e. (Exp1+PLS1)×2−(2×Exp1+PLS1)=PLS1. Furthermore, the processor 13 receives third pixel data (e.g., shown as Exp1+PLS2) corresponding to the first exposure period Exp1 and fourth pixel data (e.g., shown as 2×Exp1+PLS2) corresponding to the second exposure period Exp2 outputted by the second pixel region, and calculates a second compensation value of the second pixel region based on the third pixel data and the fourth pixel data, e.g., calculating a second difference between the third pixel data×(second exposure period/first exposure period) and the fourth pixel data, i.e. (Exp1+PLS2)×242×Exp1+PLS2)=PLS2.

In this aspect, the first pixel data and the third pixel data are respectively a part of the first image frame F1, and the second pixel data and the fourth pixel data are respectively a part of the second image frame F2.

In this aspect, the first pixel data and the second pixel data are pixel data of at least one pixel in at least one first pixel row. For example, the first pixel data and the second pixel data are readout intensity of a single pixel, or a summation or an average of readout intensity of multiple pixels of the pixel row i. The third pixel data and the fourth pixel data are pixel data of at least one pixel in at least one second pixel row (different from the first pixel row). For example, the third pixel data and the fourth pixel data are readout intensity of a single pixel, or a summation or an average of readout intensity of multiple pixels of the pixel row j.

The processor 13 then takes the first compensation value (or called first difference PLS1) as first parasitic light sensitivity of the first pixel region and the second compensation value (or second difference PLS2) as second parasitic light sensitivity of the second pixel region, wherein PLS2>PLS1.

The pixel row i and the pixel row j in FIG. 2 are not limited to a single pixel row, and may include multiple pixel rows. The processor 13 uses a calculated result (i.e. difference) of a single pixel or multiple pixels of one pixel region to represent parasitic light sensitivity of the whole of the one pixel region.

In this way, the processor 13 obtains the parasitic light sensitivity corresponding to all pixel regions (e.g., all pixel rows) of the pixel array 11. For example, the processor 13 adjusts exposure periods or gains of the first pixel region and the second pixel region based on the first compensation value and the second compensation value.

Figure 6:
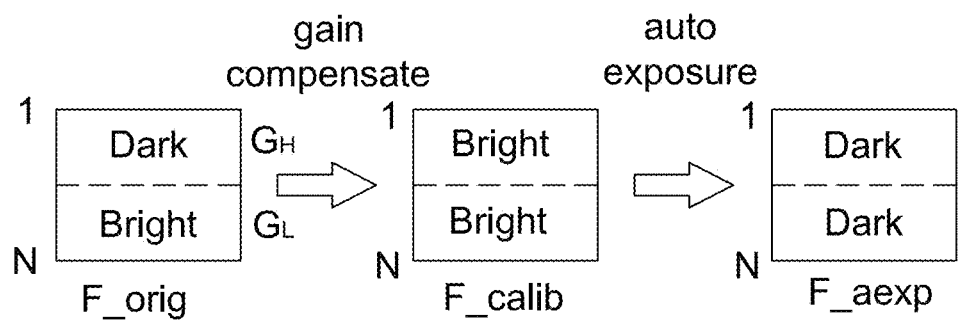
FIG. 6 is a schematic diagram of compensating parasitic light sensitivity using different gains by a global shutter sensor according to one embodiment of the present disclosure.

In one aspect, the processor 13 sets a second gain $G_L$ corresponding to the second pixel region and sets a first gain $G_H$ corresponding to the first pixel region, e.g., referring to FIG. 6. The first gain $G_H$ is determined according to the second gain $G_L$, the second compensation value and the first compensation value, e.g., the first gain=the second gain×(the second parasitic light sensitivity/the first parasitic light sensitivity), i.e. $G_H$=(PLS2/PLS1)×$G_L$, wherein $G_H$>$G_L$. Or, $G_H$=n×(PLS2/PLS1)×$G_L$, n is a positive value.

Preferably, the second pixel region is at least one pixel row at the lowest part, which has the maximum parasitic light sensitivity, of the pixel array 11. In this way, in the case that each pixel row of the pixel array 11 is one pixel region, the processor 13 controls an upper pixel row to have a larger gain than that of a lower pixel row according to parasitic light sensitivity corresponding to the each pixel row to form a uniform image.

For example, FIG. 6 shows two pixel regions as an example. Before gain compensation, the upper part of an image frame F_orig has lower readout intensity (e.g., shown as Dark) and the lower part of the image frame F_orig has higher readout intensity (e.g., shown as Bright). After the gain compensation, because a higher gain is used for the upper part, a calibrated image frame F_calib has a substantially uniform intensity (e.g., both shown as Bright), and both intensity of the bright regions are substantially identical to the lower part of the image frame F_orig. However, readout intensity of the lower part of the image frame F_orig contains higher parasitic light sensitivity, preferably the auto exposure is used to generate an auto-exposed image frame F_orig which also has a substantially uniform intensity (e.g., both shown as Dark) and both intensity of the dark regions are substantially identical to the upper part of the image frame F_orig, i.e. containing lower parasitic light sensitivity.

In an aspect that the exposure period of the pixel array 11 is determined only according to the auto-exposure operation but cannot be determined using predetermined exposure periods (e.g., two times mentioned above), the processor 13 determines whether to calculate the PLS according to whether the auto-exposure is performed between two image frames.

In one aspect, the processor 13 determines whether to perform the auto-exposure according to a comparison result between a summation or an average of intensity of a single image frame and an intensity threshold range. For example, when said summation or average exceeds the intensity threshold range, the auto-exposure is performed (increasing or decreasing); whereas, when said summation or average is within the intensity threshold range, the auto-exposure is not performed. However, the present disclosure is not limited to this method, and it is possible to use existed other methods to identify whether to perform the auto-exposure.

For example, when identifying that the auto-exposure is not performed between a first image frame and a second image frame (e.g., two adjacent image frames), the processor 13 identifies a motion according to the first image frame and the second image frame. In addition to be identified by the processor 13, the motion is directly identified by an analog circuit of the pixel array 11, e.g., identifying whether a difference of a summation of pixel data of the second image frame (e.g., directly calculated by the pixel circuit) from a summation of pixel data of the first image frame is larger than a variation threshold (e.g., configured to be positively related with a square root of the summation of pixel data of the first image frame, but not limited to). When said difference is larger than or equal to the variation threshold, a motion is identified; whereas, when said difference is smaller than the variation threshold, no motion is identified. An analog circuit capable of identifying a motion may be referred to U.S. patent application Ser. No. 17/009,417, filed on Sep. 1, 2020, assigned to the same assignee of the present disclosure, and the full disclosure of which is incorporated herein by reference.

When identifying no motion occurs between the first image frame and the second image frame, the processor 13 calculates the PLS according to multiple image frames behind the second image frame (assuming no motion within a short period of time). For example, if the processor 13 identifies the auto-exposure is performed between the second image frame and a third image frame (e.g., a next image frame), it means that the second image frame and the third image frame are acquired by different exposure periods. Then, the processor 13 calculates the PLS using the method in FIG. 2 mentioned above, i.e. the second image frame has a first exposure period EXP1 and the third image frame has a second exposure period EXP2, which have been illustrated above and thus details thereof are not repeated again. In addition, when identifying that the auto-exposure is not performed between the second image frame and the third image frame, the processor 13 does not calculate the PLS using the second image frame and the third image frame, and then the processor 13 identifies whether the auto-exposure is performed between the third image frame and a fourth image frame (a further next image frame), and repeats in this way till the predetermined multiple number is reached. That is, the PLS is calculated only when no motion is detected and there is a change between successive exposure periods (controlled by auto-exposure).

In an alternative aspect, when identifying the auto-exposure is not performed between two image frames (preferably two adjacent image frames), the processor 13 calculates a motion according to said two image frames; whereas, when identifying the auto-exposure is performed between two image frames, the processor 13 calculates the PLS according to said two image frames.

Figure 7:
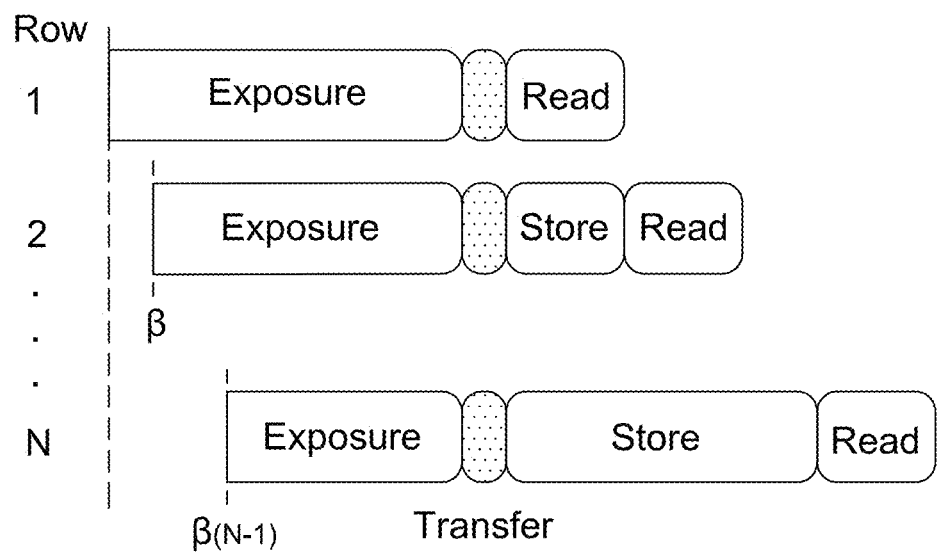
FIG. 7 is a schematic diagram of compensating parasitic light sensitivity using different exposure periods by a global shutter sensor according to one embodiment of the present disclosure.

In another aspect, the processor 13 sets a first exposure period corresponding to the first pixel region, and sets a second exposure period corresponding to the second pixel region, e.g., referring to FIG. 7. The second exposure period is determined according to the first exposure period, the first compensation value and the second compensation value, e.g., the second exposure period=the first exposure period× (1−the first parasitic light sensitivity/the second parasitic light sensitivity).

Preferably, the first pixel region is at least one pixel row of the most above part, having the maximum exposure period, of the pixel array 11. The processor 13 changes a start time (as shown in FIG. 7), an end time (not shown) or a combination thereof of the second exposure period to make the second pixel region=the first exposure period×(1− the first parasitic light sensitivity/the second parasitic light sensitivity).

In FIG. 7, the parameter β=(first parasitic light sensitivity/ second parasitic light sensitivity) or a multiple thereof. The larger the β (at lower pixel regions) indicates larger parasitic light sensitivity, and the decrement of the exposure period is larger.

In this way, in the case that each pixel row of the pixel array 11 is arranged as one pixel region, the processor 13 controls an upper pixel row to have a longer exposure period than that of a lower pixel row according to parasitic light sensitivity corresponding to the each pixel row to achieve smoothing F_orig to F_calib similar to FIG. 6.

In this aspect, because two image frames F1 and F2 with different exposure periods are used to calculate parasitic light sensitivity, preferably the processor 13 at first identifies there is no motion in image frames acquired by the pixel array 11 and then calculates the first parasitic light sensitivity and the second parasitic light sensitivity so as to improve the calculation accuracy.

In one aspect, in a normal mode (e.g., a mode for motion detection), the processor 13 enters a calibration mode (e.g., a mode for calculating gains and/or exposures corresponding to different pixel regions) automatically or manually (e.g., controlled by a used) while no motion is detected in order to obtain and record gains and/or exposure periods. Then, the normal mode is returned to perform the motion detection using the calculated gains and/or exposure periods.

The above aspect calculates parasitic light sensitivity using temporal division, and a method of calculating the parasitic light sensitivity using spatial division will be illustrated below. Please refer to FIG. 3, it is a schematic diagram of obtaining the parasitic light sensitivity using a spatial-based method by a global shutter sensor according to one embodiment of the present disclosure.

The pixel array 11 includes a first pixel region (e.g., pixel row i) and a second pixel region (e.g., pixel row j). In this aspect, the first pixel region and the second pixel region are different at least one pixel row, or different pixel regions including multiple pixels, illustrated by examples below. Preferably, the second pixel region is behind (i.e. j>i) the first pixel region in the pixel array 11.

Figure 3:
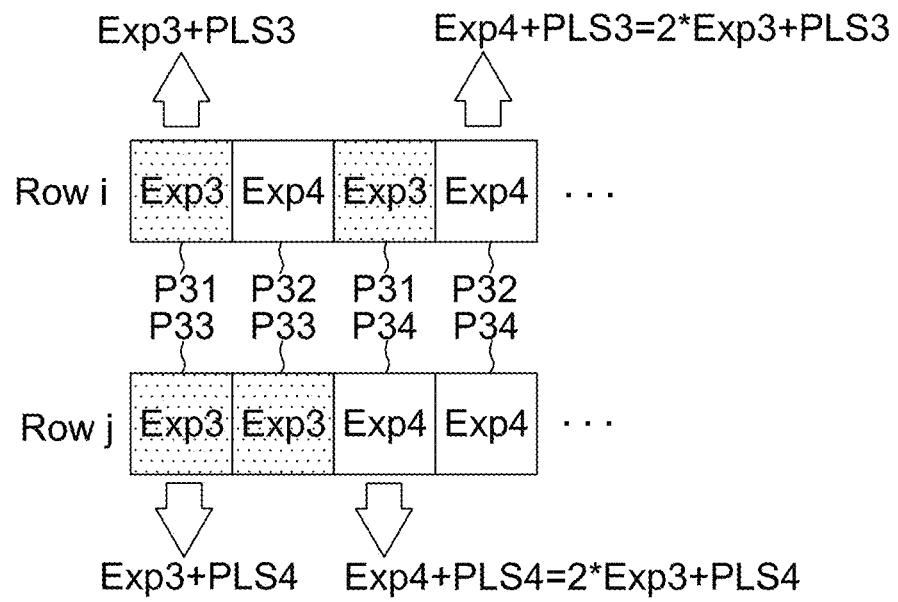
FIG. 3 is a schematic diagram of obtaining the parasitic light sensitivity using a spatial division by a global shutter sensor according to one embodiment of the present disclosure.

The first pixel region includes a first pixel P31 and a second pixel P32. The second pixel region includes a third pixel P33 and a fourth pixel P34. The pixel array 11 exposes the first pixel P31 and the third pixel P33 with a first exposure period Exp3 to respectively obtain first pixel data (e.g., show as Exp3+PLS3) and third pixel data (e.g., show as Exp3+PLS4), and expose the second pixel P32 and the fourth pixel P34 to respectively obtain second pixel data (e.g., show as Exp4+PLS3) and fourth pixel data (e.g., show as Exp4+PLS4), wherein the first exposure period is shorter than the second exposure period. In FIG. 3, Exp4=2×Exp3 is taken as an example for illustration, but not limited to.

It should be mentioned that the pixel arrangement in FIG. 3 is only intended to illustrate but not to limit the present disclosure.

The processor 13 receives the first pixel data (Exp3+PLS3) and the second pixel data (2×Exp3+PLS3), and calculates a first compensation value based on the first pixel data and the second pixel data, e.g., calculating a first difference between the first pixel data×(second exposure period/first exposure period) and the second pixel data, i.e. calculating (Exp3+PLS3)×2−(2×Exp3+PLS3)=PLS3. The processor 13 further receives the third pixel data (Exp3+PLS4) and the fourth pixel data (2×Exp3+PLS4), and calculates a second compensation value based on the third pixel data and the fourth pixel data, e.g., calculating a second difference between the third pixel data×(second exposure period/first exposure period) and the fourth pixel data i.e. calculating (Exp3+PLS4)×2−(2×Exp3+PLS4)=PLS4.

In this aspect, the first pixel data, the second pixel data, the third pixel data and the fourth data are readout intensity of a single pixel, or a summation or an average of readout intensity of multiple pixels of the same pixel region. Similarly, the processor 13 uses a calculated result of a single pixel or multiple pixels of one pixel region to represent the whole of the one pixel region. That is, PLS3 indicates the parasitic light sensitivity of the pixel i, and PLS4 indicates the parasitic light sensitivity of the pixel j.

The processor 13 then takes the first compensation value (or called first difference PLS3) as first parasitic light sensitivity and the second compensation value (or second difference PLS4) as second parasitic light sensitivity, wherein PLS4>PLS3.

In an aspect adopting a color pixel array, the first difference PLS3 and the second difference PLS4 are preferably calculated using long-exposed pixels and short-exposed pixels within a region of the same color.

Figure 4:
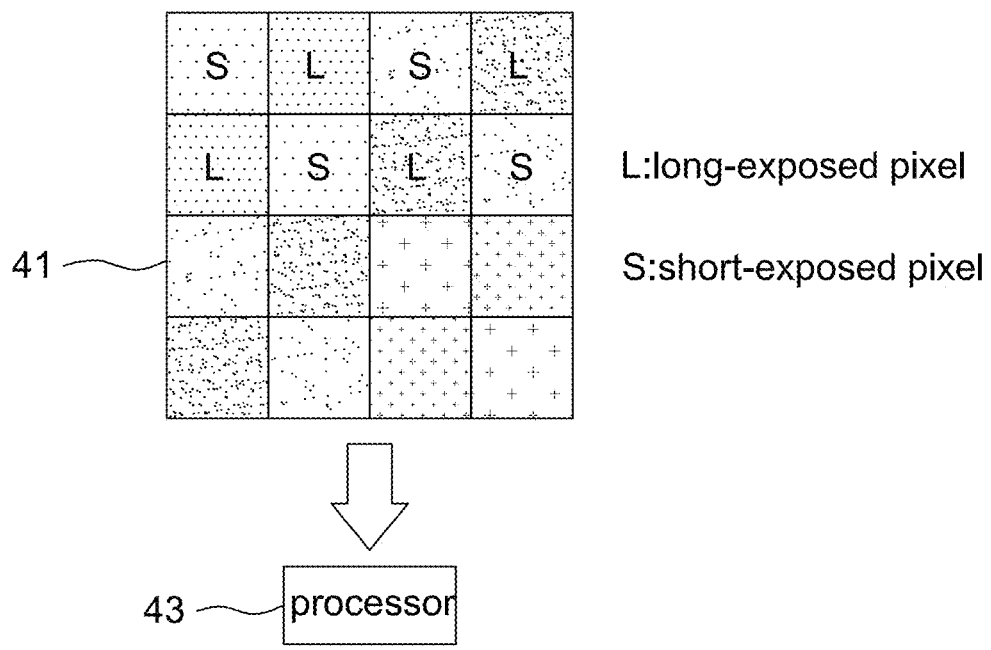
FIG. 4 is a schematic diagram of arranging different exposed pixels in a color pixel array of a global shutter sensor according to one embodiment of the present disclosure.

For example, FIG. 4 shows a color pixel array having three colors. The first difference PLS3 and the second difference PLS4 are calculated using a single or two long-exposed pixels L and a single or two short-exposed pixels S of a first color (e.g., 4 pixels at top-left corner); or calculated using a single or two long-exposed pixels L and a single or two short-exposed pixels S of a second color (e.g., 4 pixels at top-right corner). The calculated parasitic light sensitivity (i.e. the difference) represents the result of the same color in the same pixel region.

Figure 5A:
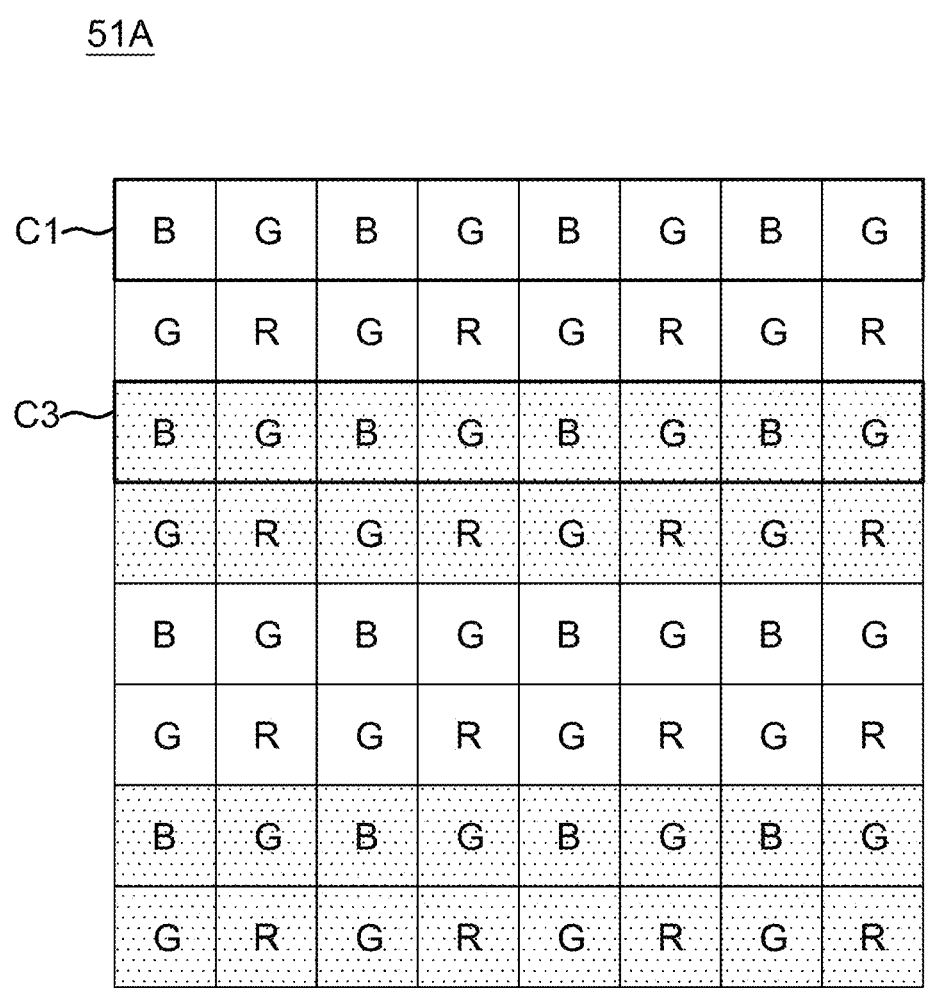

For example referring to FIG. 5A, it is a first Bayer pattern of the color pixel array. In this aspect, a first pixel region is, for example, a pixel row C1 and a second pixel region is, for example, a pixel row C3. The first difference PLS3 and the second difference PLS4 are respectively calculated using a single or multiple long-exposed pixels and a single or multiple short-exposed pixels of any color (e.g., R, G or B) in the pixel row C1 and the pixel row C3.

For example referring to FIG. 5B, it is a second Bayer pattern of the color pixel array. In this aspect, a first pixel region is, for example, a pixel block B1 and a second pixel region is, for example, a pixel block B2. The first difference PLS3 and the second difference PLS4 are respectively calculated using a single or multiple (e.g., two green pixels) long-exposed pixels and a single or multiple (e.g., two green pixels) short-exposed pixels of any color (e.g., R, G or B) in the pixel block B1 and the pixel block B2.

Figure 5C:
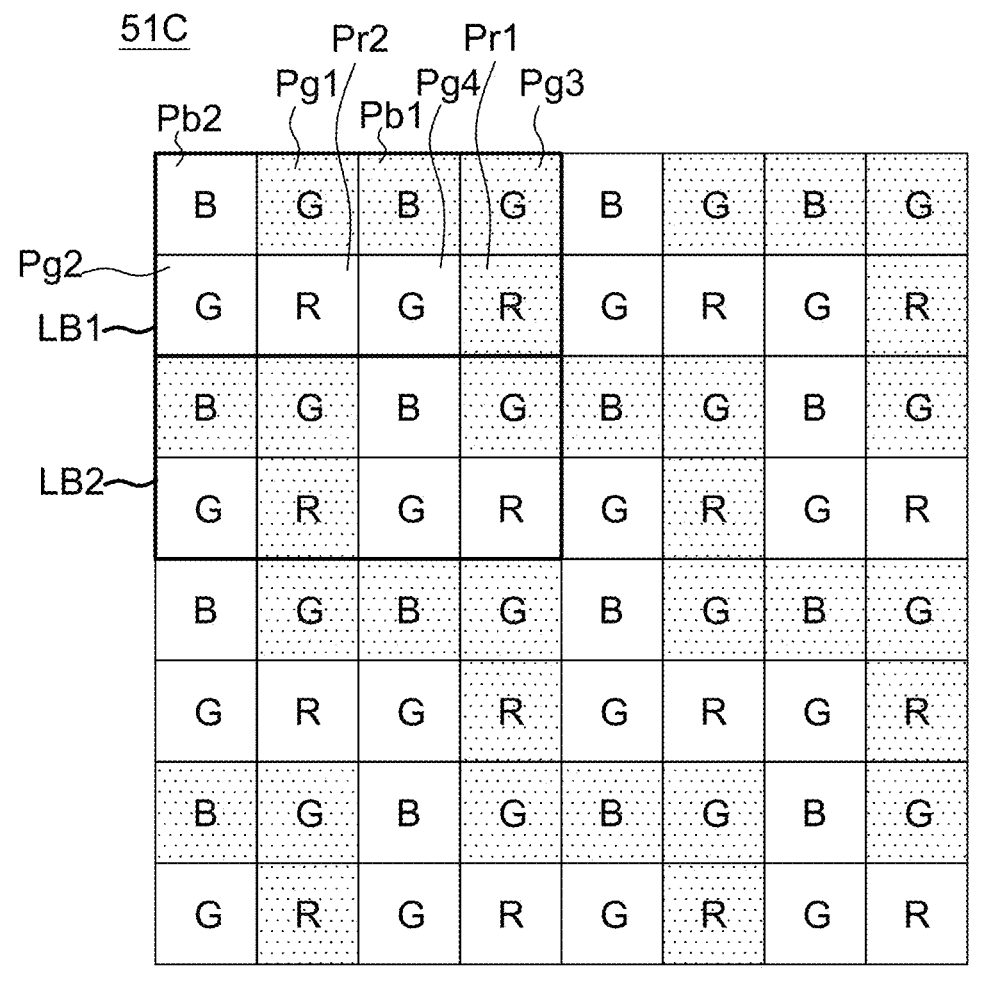

For example referring to FIG. 5C, it is a third Bayer pattern of the color pixel array. In this aspect, a first pixel region is, for example, a pixel block LB1 and a second pixel region is, for example, a pixel block LB2. The first difference PLS3 and the second difference PLS4 are respectively calculated using a single or multiple long-exposed pixels and a single or multiple short-exposed pixels of any color (e.g., R, G or B) in the pixel block LB1 and the pixel block LB2. For example, the parasitic light sensitivity of the pixel block LB1 is calculated using pixels Pg1 and Pg2, Pg1 and Pg4, pixels Pg1+Pg3 and Pg2+Pg4, or using pixels Pb1 and Pb2, or using pixels Pr1 and Pr2, or using a summation or an average of the parasitic light sensitivity calculated by different color pixels. The parasitic light sensitivity of the pixel block LB2 is calculated using a similar method, and thus details thereof are not repeated herein.

In FIGS. 5A to 5C, blank regions indicate long-exposed pixels and regions filled with dots indicate short-exposed pixels. It is appreciated that FIG. 4 and FIGS. 5A to 5C are some arrangements of the color pixel array, but the present disclosure is not limited thereto.

In this way, the processor 13 calculates the parasitic light sensitivity corresponding to all pixel regions (e.g., all pixel rows) of the pixel array 11 as long as the pixel array 11 has a part of pixels exposed for a longer period and another part of pixels exposed for a shorter period. For example, the processor 13 adjusts exposure periods or gains of the first pixel region and the second pixel region based on the first compensation value and the second compensation value.

In one aspect, the processor 13 sets a second gain $G_L$ corresponding to the second pixel region and sets a first gain $G_H$ corresponding to the first pixel region, e.g., referring to FIG. 6. The first gain $G_H$ is determined according to the second gain $G_L$, the second compensation value and the first compensation value, e.g., the first gain=the second gain×(the second parasitic light sensitivity/the first parasitic light sensitivity), i.e. $G_H$=(PLS4/PLS3)×$G_L$, wherein $G_H$>$G_L$. Or, $G_H$=n×(PLS2/PLS1)×$G_L$, n is a positive value.

Preferably, the second pixel region is at least one pixel row at the lowest part, which has the maximum parasitic light sensitivity, of the pixel array 11. In this way, in the case that each pixel row of the pixel array 11 is one pixel region, the processor 13 controls an upper pixel row to have a larger gain than that of a lower pixel row according to parasitic light sensitivity corresponding to the each pixel row to obtain a uniform image.

In another aspect, the processor 13 sets a first exposure period corresponding to the first pixel region, and sets a second exposure period corresponding to the second pixel region, e.g., referring to FIG. 7. The second exposure period is determined according to the first exposure period, the first compensation value and the second compensation value, e.g., the second exposure period=the first exposure period× (1−the first parasitic light sensitivity/the second parasitic light sensitivity).

Preferably, the first pixel region is at least one pixel row of the most above part, having the maximum exposure period, of the pixel array 11. The processor 13 changes a start time (as shown in FIG. 7), an end time (not shown) or a combination thereof of the second exposure period in adjusting the second exposure period to make the second pixel region=the first exposure period−(1−the first parasitic light sensitivity/the second parasitic light sensitivity).

In this way, in the case that each pixel row of the pixel array 11 is arranged as one pixel region, the processor 13 controls an upper pixel row to have a longer exposure period than that of a lower pixel row according to parasitic light sensitivity (or a compensation value) corresponding to the each pixel row to smooth an image.

In this aspect, because the parasitic light sensitivity is calculated using different pixel regions having different exposure periods, the processor 13 preferably further identifies object images in an image frame according to edge(s) for determining the used pixel regions. Because the variation between readout intensity in the same object image is considered to be small, it is possible to calculate more accurate parasitic light sensitivity using pixels within the same edge(s). The method of identifying the object image using edge(s) is known to the art, and thus details thereof are not described herein. For example, the processor 13 selects the first pixel and the second pixel as two pixels within a first object image in an image frame captured by the pixel array 11, and selects the third pixel and the fourth pixel as two pixels within a second object image in the image frame captured by the pixel array 11. The first object image is not limited to be identical to the second object image.

Preferably, in a normal mode, the processor 13 enters a calibration mode automatically or manually at any time, and calculates and records gains and/or exposure periods using pixels in the same object image determined by edge(s). Next, the normal mode is returned in which the calculated gains and/or exposure periods are used to perform the motion detection.

In brief, in the global shutter sensor of the present disclosure, a pixel array is used to acquire first pixel data and second pixel data of different pixel regions using a first exposure period and a second exposure period, which is longer than the first exposure period. For example, the second exposure period is two times of the first exposure period. The processor 13 receives the first pixel data (e.g., Exp1+PLS1 shown in FIG. 2 and Exp3+PLS3 shown in FIG. 3) and the second pixel data (e.g., 2×Exp1+PLS1 shown in FIG. 2 and 2×Exp3+PLS3 shown in FIG. 3) of a pixel region, and calculates a difference between the first pixel data×(second exposure period/first exposure period) and the second pixel data as the parasitic light sensitivity (or called a compensation value) of the pixel region, i.e. calculating 2×(Exp1+PLS1)−(2×Exp1+PLS1) or 2×(Exp3+PLS3)−(2×Exp3+PLS3).

The processor 13 then sets at least one of gains and exposure periods corresponding to different pixel regions according to ratios of parasitic light sensitivity between the different pixel regions, e.g., one of pixel regions in the pixel array 11 being selected as the reference. Because the non-uniformity of image brightness is generally in up and down directions, said different pixel regions are preferably include at least one pixel row, and a number of pixel rows is determined according to the degree of nonuniformity.

In one aspect, the processor 13 calculates the parasitic light sensitivity using a time-based method. In this aspect, the first pixel data and the second pixel data are pixel data acquired by the same pixel(s) corresponding to different exposure periods, e.g., as shown in FIG. 2.

In another aspect, the processor 13 calculates the parasitic light sensitivity using a spatial-based method. In this aspect, the first pixel data and the second pixel data are pixel data acquired by different pixels corresponding to different exposure periods, e.g., as shown in FIG. 3.

As mentioned above, the first pixel data and the second pixel data are pixel data of a single pixel or a summation or an average of pixel data of multiple pixels without particular limitations.

It should be mentioned that all values, such as exposure periods, the ratio and pixel numbers in the present disclosure are only intended to illustrate but not to limit the present disclosure.

It should be mentioned that although pixel row(s) are used as an example to illustrate the pixel region, the present disclosure is not limited thereto. In the present disclosure, the pixel region is a region in the pixel array having any pixel number and any shape depending on actual detection region, e.g., minimum of one pixel, at least one pixel column, at least one pixel row.

It should be mentioned that although an embodiment in FIG. 2 takes the first interval being a short exposure and the second interval being a long interval as an example, the present disclosure is not limited thereto. In other aspects, the first interval is a long exposure and the second interval is a short interval. The PLS can be calculated as long as two image frames are captured using different exposure periods, respectively.

In the present disclosure, each pixel can be compensated according to the PLS corresponding to each pixel region calculated by the above methods. In an aspect required to reduce the operation load of the processor 13, the processor 13 calculates an average or a weighting summation of PLSs corresponding to all pixel regions, and then all pixel pixels are compensated using the same average PLS or the same weighting summation. The reason is that in addition to the PLS during the storage time, different incident light intensity contributes to light leakage which also causes the nonuniformity of image. By calculating an average or a weighting summation of PLSs of all pixel regions to compensate all pixels, the nonuniformity of image is also improved. The weighting of the weighting summation is determined previously before shipment.

For example, a predetermined relationship between the average PLS or the PLS weighting summation and the gain and/or exposure period is determined before shipment. e.g., including the relationship between multiple PLS intervals or multiple PLS weighting summation intervals and multiple gains and/or exposure periods. After calculating an average PLS or an PLS weighting summation of multiple pixel regions (e.g., the first pixel and the second pixel region mentioned above) in operation, the processor 13 identifies which of the multiple PLS intervals or the multiple PLS weighting summation intervals that the average PLS or the PLS weighting summation is within so as to accordingly determine corresponding gains and/or exposure periods of the multiple pixel regions.

In the present disclosure, the calculated PLSs are sometimes called compensation values since they are used to compensate brightness of pixel regions of the pixel array 11.

As mentioned above, a global shutter sensor stores charges at floating diffusion of different pixel rows for different time intervals that suffers from different parasitic light sensitivity to cause an image have nonuniform brightness.

Accordingly, the present disclosure further provides a time-based method for obtaining the parasitic light sensitivity (e.g., FIG. 2), a spatial-based method for obtaining the parasitic light sensitivity (e.g., FIG. 3) as well as a global shutter sensor using the parasitic light sensitivity obtained by these methods to arrange gains and/or exposure periods corresponding to different pixel regions to compensate the parasitic light sensitivity.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A global shutter sensor, comprising:
a pixel array, comprising a first pixel region and a second pixel region, and configured to acquire a first image frame and a second image frame respectively using a first exposure period and a second exposure period, which is longer than the first exposure period; and
a processor, configured to
receive first pixel data corresponding to the first exposure period and second pixel data corresponding to the second exposure period outputted by the first pixel region,
calculate a first compensation value of the first pixel region based on the first pixel data and the second pixel data,
receive third pixel data corresponding to the first exposure period and fourth pixel data corresponding to the second exposure period outputted by the second pixel region,
calculate a second compensation value of the second pixel region based on the third pixel data and the fourth pixel data, and
adjust exposure periods or gains of the first pixel region and the second pixel region based on the first compensation value and the second compensation value.

2. The global shutter sensor as claimed in claim 1, wherein
the first pixel region and the second pixel region are different at least one pixel row or at least one pixel column of the pixel array,
the first pixel data and the second pixel data are pixel data of at least one pixel in at least one first pixel row or at least one first pixel column, and
the third pixel data and the fourth pixel data are pixel data of at least one pixel in at least one second pixel row or at least one second pixel column.

3. The global shutter sensor as claimed in claim 1, wherein the second pixel region is behind the first pixel region in the pixel array, and the processor is configured to
set a second gain corresponding to the second pixel region, and
set a first gain corresponding to the first pixel region, and the first gain is determined according to the second gain, the second compensation value and the first compensation value.

4. The global shutter sensor as claimed in claim 3, wherein
each pixel row of the pixel array is one pixel region, and
the processor is configured to control an upper pixel row to have a larger gain than that of a lower pixel row according to a compensation value corresponding to the each pixel row.

5. The global shutter sensor as claimed in claim 1, wherein the second pixel region is behind the first pixel region in the pixel array, and the processor is further configured to
set a first exposure period corresponding to the first pixel region, and
set a second exposure period corresponding to the second pixel region, and the second exposure period is determined according to the first exposure period, the first compensation value and the second compensation value.

6. The global shutter sensor as claimed in claim 5, wherein the processor is configured to change at least one of a start time and an end time of the second exposure period in adjusting the second exposure period.

7. The global shutter sensor as claimed in claim 5, wherein
each pixel row of the pixel array is one pixel region, and
the processor is configured to control an upper pixel row to have a longer exposure period than that of a lower pixel row according to a compensation value corresponding to the each pixel row.

8. The global shutter sensor as claimed in claim 1, wherein the processor is further configured to calculate the first compensation value and the second compensation value after identifying there is no motion between image frames acquired by the pixel array prior to the first image frame.

9. The global shutter sensor as claimed in claim 1, wherein the processor is configured to adjust the exposure periods and the gains according to an average or a weighting summation of the first compensation value and the second compensation value.

10. A global shutter sensor, comprising:
a pixel array, configured to acquire first pixel data and second pixel data respectively using a first exposure period and a second exposure period, which is different from the first exposure period; and
a processor, configured to
receive the first pixel data and the second pixel data,
calculate a compensation value of the pixel array based on the first pixel data and the second pixel data, and
adjust exposure periods or gains of the pixel array based on compensation values of different pixel regions.

11. The global shutter sensor as claimed in claim 10, wherein
the first pixel data and the second pixel data are pixel data acquired by a same pixel respectively corresponding to the first exposure period and the second exposure period, or
the first pixel data and the second pixel data are pixel data acquired by different pixels respectively corresponding to the first exposure period and the second exposure period.

12. The global shutter sensor as claimed in claim 10, wherein the processor is configured to adjust the exposure periods or the gains according to a ratio between the compensation values of different pixel regions.

13. The global shutter sensor as claimed in claim 10, wherein the processor is configured to adjust the exposure periods or the gains according to an average or a weighting summation of the compensation values of different pixel regions.

14. A global shutter sensor, comprising:
a pixel array, configured to acquire a first image frame and a second image frame respectively using a first exposure period and a second exposure period; and
a processor, configured to
determine the first exposure period and the second exposure period based on auto-exposure,
identify a motion according to the first image frame and the second image frame upon the first exposure period being identical to the second exposure period, and
calculate parasitic light sensitivity according to the first image frame and the second image frame upon the first exposure period being different from the second exposure period, and adjust exposure periods or gains of the pixel array based on parasitic light sensitivity of different pixel regions.

15. The global shutter sensor as claimed in claim 14, wherein the pixel array comprises a first pixel region and a second pixel region, the processor is further configured to
receive first pixel data corresponding to the first exposure period and second pixel data corresponding to the second exposure period outputted by the first pixel region,
calculate a first parasitic light sensitivity based on the first pixel data and the second pixel data,
receive third pixel data corresponding to the first exposure period and fourth pixel data corresponding to the second exposure period outputted by the second pixel region, and
calculate a second parasitic light sensitivity based on the third pixel data and the fourth pixel data.

16. The global shutter sensor as claimed in claim 15, wherein the processor is further configured to
average the first parasitic light sensitivity and the second parasitic light sensitivity to obtain average parasitic light sensitivity, and
determine gains of the first pixel region and the second pixel region corresponding to the average parasitic light sensitivity based on a predetermined relationship.

17. The global shutter sensor as claimed in claim 15, wherein the processor is further configured to
average the first parasitic light sensitivity and the second parasitic light sensitivity, and
determine exposure periods of the first pixel region and the second pixel region corresponding to the average parasitic light sensitivity based on a predetermined relationship.

18. The global shutter sensor as claimed in claim 15, wherein
the first pixel region and the second pixel region are different at least one pixel row or at least one pixel column of the pixel array,
the first pixel data and the second pixel data are pixel data of at least one pixel in at least one first pixel row or at least one first pixel column, and
the third pixel data and the fourth pixel data are pixel data of at least one pixel in at least one second pixel row or at least one second pixel column.

19. The global shutter sensor as claimed in claim 15, wherein the processor is further configured to
calculate a weighting summation of the first parasitic light sensitivity and the second parasitic light, and
determine gains of the first pixel region and the second pixel region corresponding to the weighting summation based on a predetermined relationship.

20. The global shutter sensor as claimed in claim 15, wherein the processor is further configured to
calculate a weighting summation the first parasitic light sensitivity and the second parasitic light sensitivity, and
determine exposure periods of the first pixel region and the second pixel region corresponding to the weighting summation based on a predetermined relationship.

* * * * *